United States Patent [19]

Ogasawara

[11] Patent Number: 4,831,245

[45] Date of Patent: May 16, 1989

[54] SYSTEM FOR DATA FIELD AREA ACQUISITION IN IC CARD FOR MULTIPLE SERVICES

[75] Inventor: Nobuo Ogasawara, Kawasaki, Japan

[73] Assignee: Fujitsu Limited, Kawasaki, Japan

[21] Appl. No.: 97,622

[22] Filed: Sep. 16, 1987

[30] Foreign Application Priority Data

Sep. 16, 1986 [JP] Japan ................................ 61-217723

[51] Int. Cl.$^4$ ............................................ G06K 19/06
[52] U.S. Cl. .................................... 235/492; 235/380; 340/825.33
[58] Field of Search ............... 235/379, 380, 492, 382; 340/825.31, 825.33

[56] References Cited

U.S. PATENT DOCUMENTS 4,656,342 4/1987 Ugon ................................. 235/380 X
4,734,568 3/1988 Watanabe ......................... 235/380 X
4,736,094 4/1988 Yoshida .............................. 235/379
4,739,295 4/1988 Hayashi et al. .................. 235/492 X

OTHER PUBLICATIONS

Jerome Svigals, "Smart Card"—The Ultimate Personal Computer, MacMilian Publishing Company, 1987, Revised from Jerome Svigals: "Smart Cards", The New Bank Cards, MacMillan Publishing Company, 1985, pp. 1-7, 124-127 and 132-135.

ISO/TC68/SC6/WG7, Part 1 to Part 6, is a part of ISO/TC68/SC6/WG7/N81, which was established on Oct. 22, 1985.

Primary Examiner—David L. Trafton
Attorney, Agent, or Firm—Staas & Halsey

[57] ABSTRACT

Information indicating the limit of size of area which is permitted to a service provider and an authentication code of the service supplier are stored in an IC card upon issuance. When a service is to be added, a service supplier is authenticated, and thereafter, acquistion of a data field area within a predetermined size of data field area is permitted. Thus, in the IC card for multiple services, upon addition of a new service after card issuance, the use of a remainder vacant area in the IC card by an unauthenticated service supplier and the exclusive use of the vacant area by a specific service supplier are prevented.

6 Claims, 8 Drawing Sheets

SYSTEM FOR DATA FIELD AREA ACQUISITION IN IC CARD FOR MULTIPLE SERVICES

BACKGROUND OF THE INVENTION

1. Field of the Invention

The present invention relates to a system for acquiring a data field in an integrated circuit card (IC card) for multiple services. The system according to the present invention discriminates whether or not a service for which a data field area is acquired is provided by an authorized source, and controls the acquisition of the data field area within an allowable range.

2. Description of the Related Art

In an IC card for multiple serices, all the services to be provided are not always determined upon card issuance. The IC card often has vacant areas. When the IC card has vacant areas, some services may be additionally provided to the vacant areas in the card after card issuance.

The source which additionally provides a service must not be an arbitrary third party, but one of several limited companies, organizations, company groups, organization groups, or the like. Also, the data field area used must be limited. If a given service supplier is allowed to use any size of area, another would find it difficult to additionally provide a service. Therefore, it is desired that each service supplier be allowed to use only up to a predetermined size of area.

In a conventional system for acquiring a data field area, the data field area is additionally acquired based on the area size demand input from a terminal apparatus to an IC card and the data field information already formed in the IC card.

In the conventional system, data field formation demand input from a terminal apparatus can be accepted regardless of the diameter, and the data field area, corresponding to the demanded area size is acquired in so far as there is a vacant data field area in the IC card. In the conventional system, therefore, there are problems that, if only a former of a data field obtains a right and approval for forming an area, a data field may be formed in the IC card by an unauthorized source, or the data field area in the IC card may be exclusively occupied by a specific service supplier, and there may be a disadvantage that, if an attempt is made to add an additional service to the IC card, there is no area vacant for such an additional service.

SUMMARY OF THE INVENTION

It is an object of the present invention to provide an improved system for data field area acquisition wherein a plurality of area under identifications and authentication codes and usable area size data are stored in an IC card upon issuance of the IC card. A data field formation demand by a person other than an authenticated area user or a data field formation demand for an area larger than a predetermined size is rejected, so the IC card can be protected from illegal data field formation.

According to the present invention, there is provided a system for data field area acquisition in an IC card for multiple services, the system including: a plurality of data fields for storing data; an area user identification input unit; an area user authentication code input unit; an area size demand input unit; an area user authentication unit; an area size calculating unit for calculating a remainder area for an authenticated area user; a table storage unit for storing a table for data field control; and a data field area acquiring unit. The calculation of a remainder area for user authenticated by said area user authentication unit is carried out based on an input area size demand and information stored in the table storage unit. Based on the cumulative result of the area user authentication and the calculation of the remainder area for the authenticated area user, acquisition of an additional data field area is carried out within a limit of usable area size.

BRIEF DESCRIPTION OF THE DRAWINGS

In the drawings,

FIG. 4 illustrates how FIGS. 4A and 4B are connected;

FIG. 5 illustrates how FIGS. 5A and 5B are connected; and

DESCRIPTION OF THE PREFERRED EMBODIMENT

Figure 1:
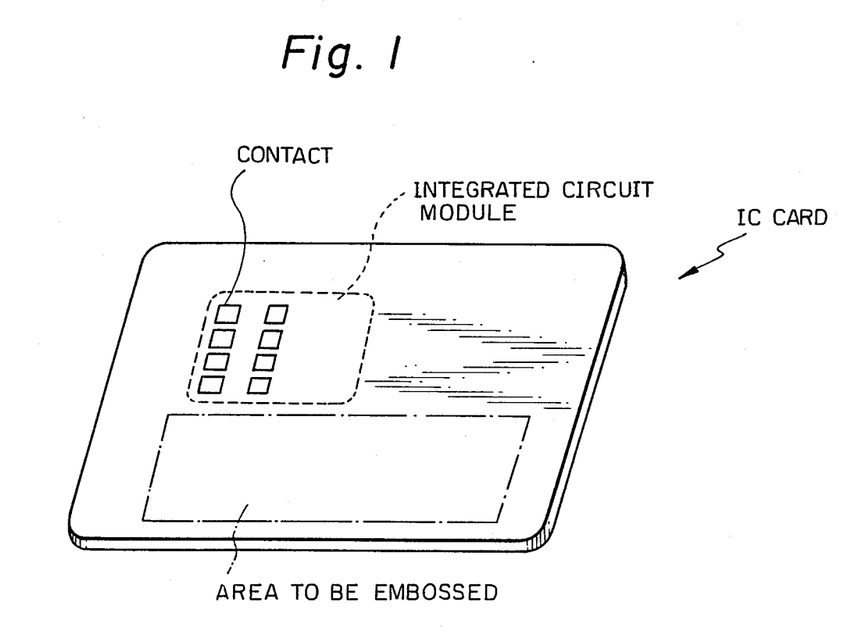
FIG. 1 is a perspective view of an IC card used in a system of the present invention.
Figure 2:
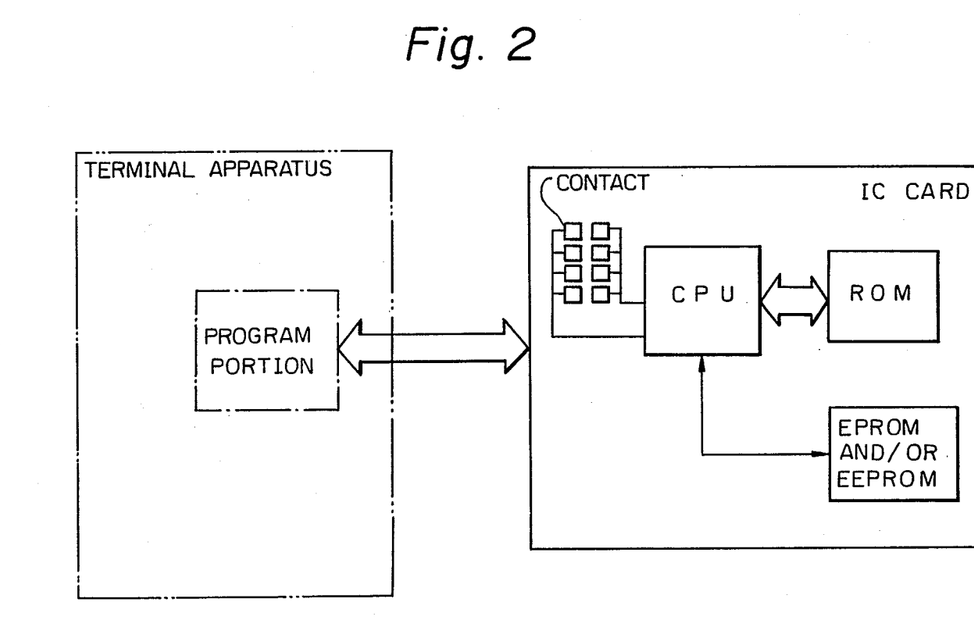
FIG. 2 is a circuit diagram of a terminal apparatus connected to an IC card when the IC card used in the system of the present invention is used.

Prior to a description of a preferred embodiment of the present invention, an IC card as used both in the system of the present invention and in a conventional system will be described. FIGS. 1 and 2 are for explaining an IC card. As shown in FIG. 1, an IC card has contacts, an integrated circuit module arranged beneath the contacts, and an area to be embossed.

FIG. 2 shows a terminal apparatus electrically connected to the IC card, a program portion for requesting formation of a data field, and a transmission path through which an area user identification and an authentication code (AC code) designated by the program and an area size demand are transmitted to the IC card.

The IC card includes a CPU as a data processor, a memory, such as EPROM and/or EEPROM, for storing input information, control information, and data fields, and a ROM for storing control programs. In addition, a plurality of metal contacts for electrically contacting an exteral apparatus are provided on the surface or back of the card.

Figure 3:
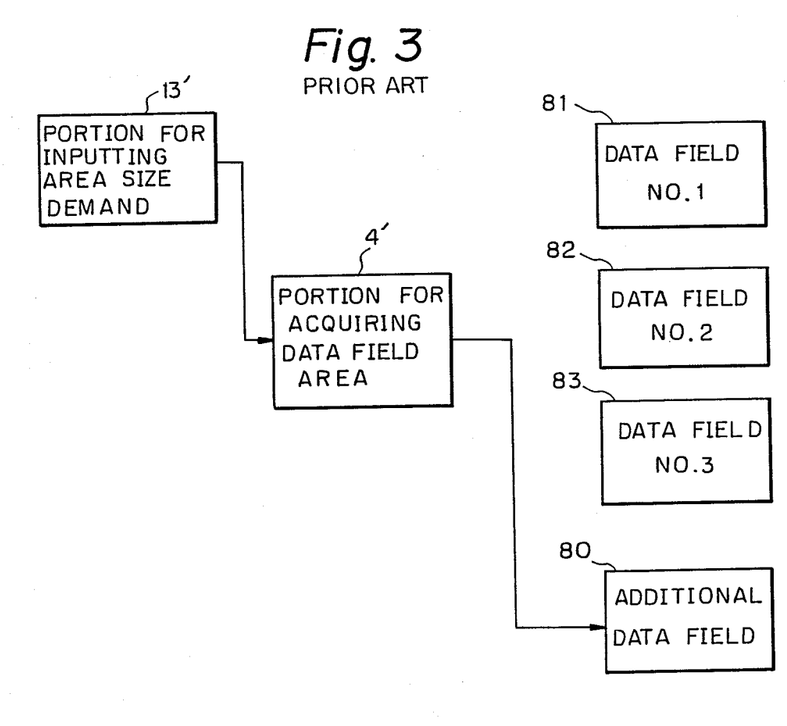
FIG. 3 is a block diagram of a conventional system.

FIG. 3 shows an example of a conventional system for acquiring a data field area. In FIG. 3, reference numeral 13' denotes a portion for inputting an area size demand; 81, 82, and 83, data fields already formed in an IC card; 80, an additionally acquired data field; and 4', a portion for acquiring data field data.

In the conventional system shown in FIG. 3, a data field information demand sent from a terminal apparatus is accepted regardless of the requester when the requester is authenticated by general authentication such as a personal identification number and an authentication code for an IC card. Thus, a data field area corresponding to an area size demand is acquired by the portion 4' as long as the IC card has a vacant area. In this manner, a data field is additionally formed.

Figure 4:
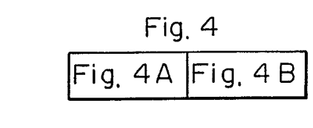
Figure 4A:
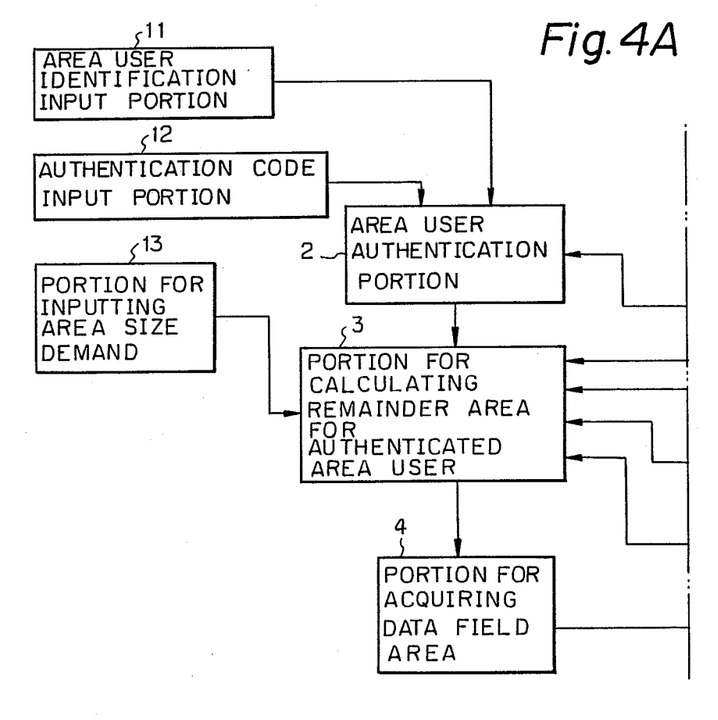
FIGS. 4A and 4B form a block diagram of a system according to an embodiment of the present invention.
Figure 4B:
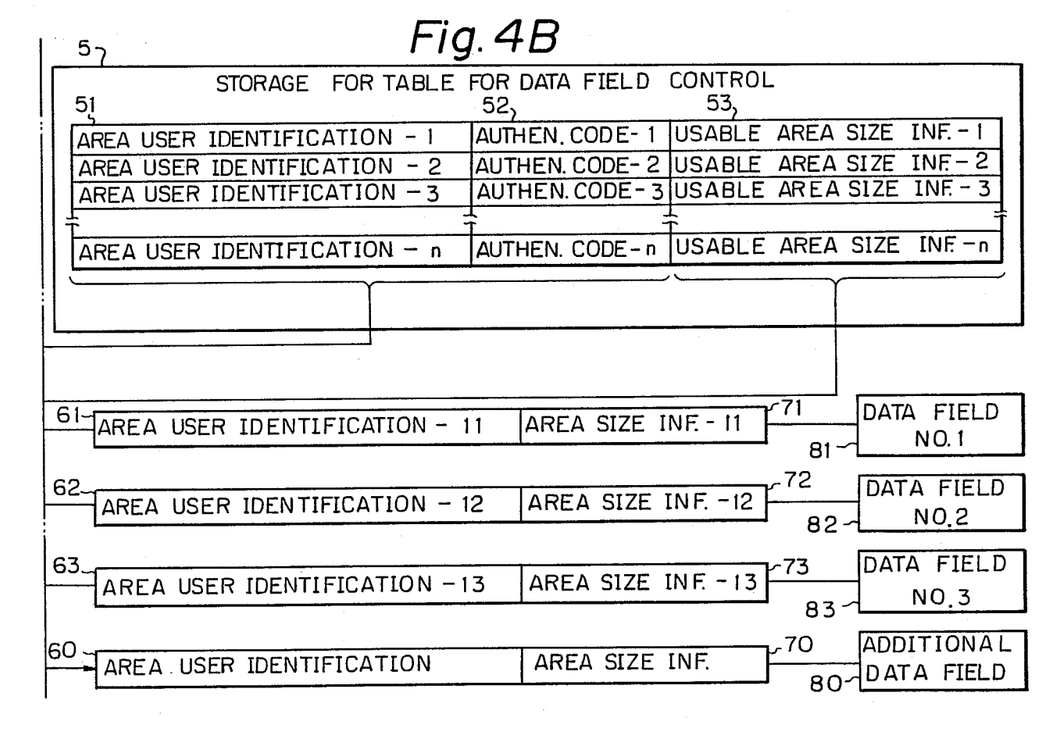

A system for data field area acquisition in an IC card for plural services according to an embodiment of the present invention will now be described with reference to FIGS. 4, 4A, 4B, 5, 5A and 5B. FIGS. 4, 4A and 4B (hereinafter collectively referred to as FIG. 4) shows a system according to an embodiment of the present invention.

The system of FIG. 4 includes an area user identification inputting portion 11, an authentication code inputting portion 12, a portion 13 for inputting an area size demand, and storage 5 for a table for data field control, including area user identifications 51, area user authentication codes 52, and usable area sizes 53.

The system of FIG. 4 also includes memories for area user identifications 61, 62, and 63 corresponding to the data fields, area size information 71, 72, and 73 corresponding to the data fields, data fields 81, 82, and 83, an area user identification 60 corresponding to a data field 80 to be additionally acquired, an area size information 70 of the data field to be additionally acquired, and an additionally acquired data field 80.

The system of FIG. 4 further includes an area user authentication portion 2, a portion 3 for calculating a remainder area for an authenticated area user; and a portion 4 for additionally acquiring a data field area.

The operation of the system shown in FIG. 4 will now be described. The authenticating portion 2 compares an input area user identification from the portion 11 and an input authentication code from the potion 12 with a corresponding area user identification and an authentication code corresponding to an area user. An identification in the table storage 5 which coincides with the area user identification is validated with regard to the input authentication code, thereby authenticating an area user.

When an area user is authenticated, a sum of area sizes of already formed fields is subtracted from a corresponding usable area size in the table storage 5, thereby calculating a remainder usable area of the corresponding area user.

When the remainder usable area size is equal to or larger than the demand area size, the data field area acquiring portion 4 is operated.

When the vacant area in the IC card is equal to or larger than the demanded area size, the data field area acquiring portion 4 acquires an area in the vacant area, and thus additionally forms a data field.

Figure 5A:
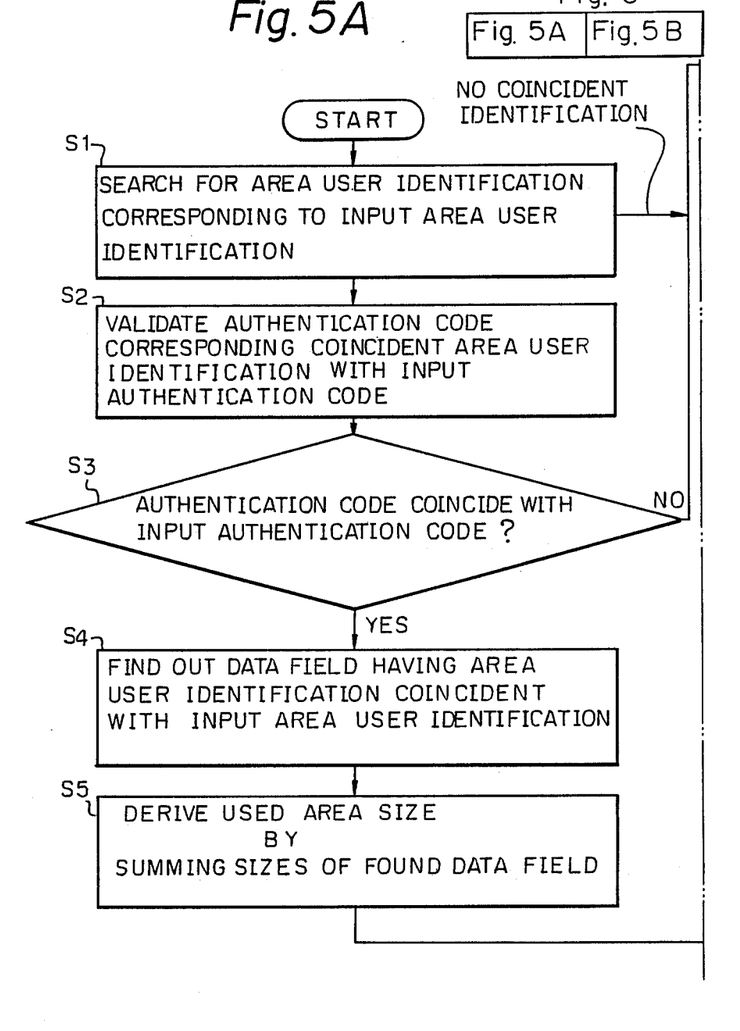
FIGS. 5A and 5B form a flow chart showing the operation of the system shown in FIG. 4.
Figure 5B:
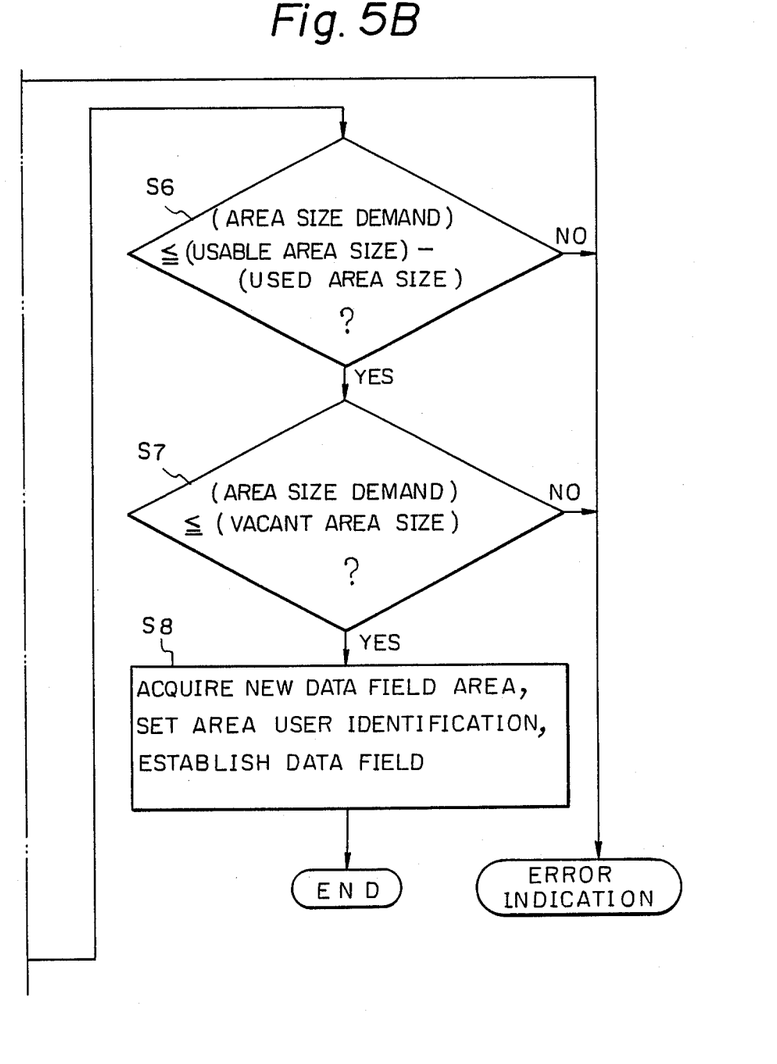

FIGS. 5, 5A and 5B form a flow chart for explaining the operation of the system shown in FIG. 4.

A memory data field formation demand, a user identification, an authentication code, and an area size demand for the IC card are received from a terminal apparatus.

The CPU searches for an area user identification corresponding to the input area user identification in the table storage 5 (step S1).

When no coincident identification is found, it is determined that a demander is not an authenticated area user, and an error indication is made. For example, a nonresponse state is established for an external apparatus, or information indicating that registration is not permitted is indicated as a response signal.

If a coincident identification is found, an authentication code in the table storage corresponding to the identification is validated with regard to the input authentication code (step S2).

If the validation result is noncoincidence, it is determined that a demander is not an authenticated area user, and an error indication is made. However, when coincidence is established, it is determined that a demander is an authenticated area user, and the control advances to authentication of the area size (step S3).

Area user identifications in data fields in the IC card are compared with the input area user identification so as to find a coincident data field (step S4).

Then, the CPU sums the area sizes of these data fields and derives the sum as a used area size with respect to the area user identification (step S5). If the area has not been used, the sum is zero. Next, the used area size is subtracted from a usable area size in the table storage corresponding to the area user identification, and the difference is compared with the input area size demand. If the difference is smaller than the area size demand in the above comparison step, an error indication is made since a vacant area is not available (step S6).

If the difference is equal to or larger than the area size demand, the area size demand is compared with the area size of the vacant area in the IC card. If the area size demand is larger than the vacant area, an error indication is made since the vacant area is not available (step S7).

If the area size demand is equal to or smaller than the vacant area size, a new data field area is acquired from the vacant area of the IC card, an area user identification and an area size are set, and a data field is additionally formed. Thus, the processing is ended (step S8). As the area user identification, an identification of a service supplier or that for a group of service suppliers is used.

Figure 6:
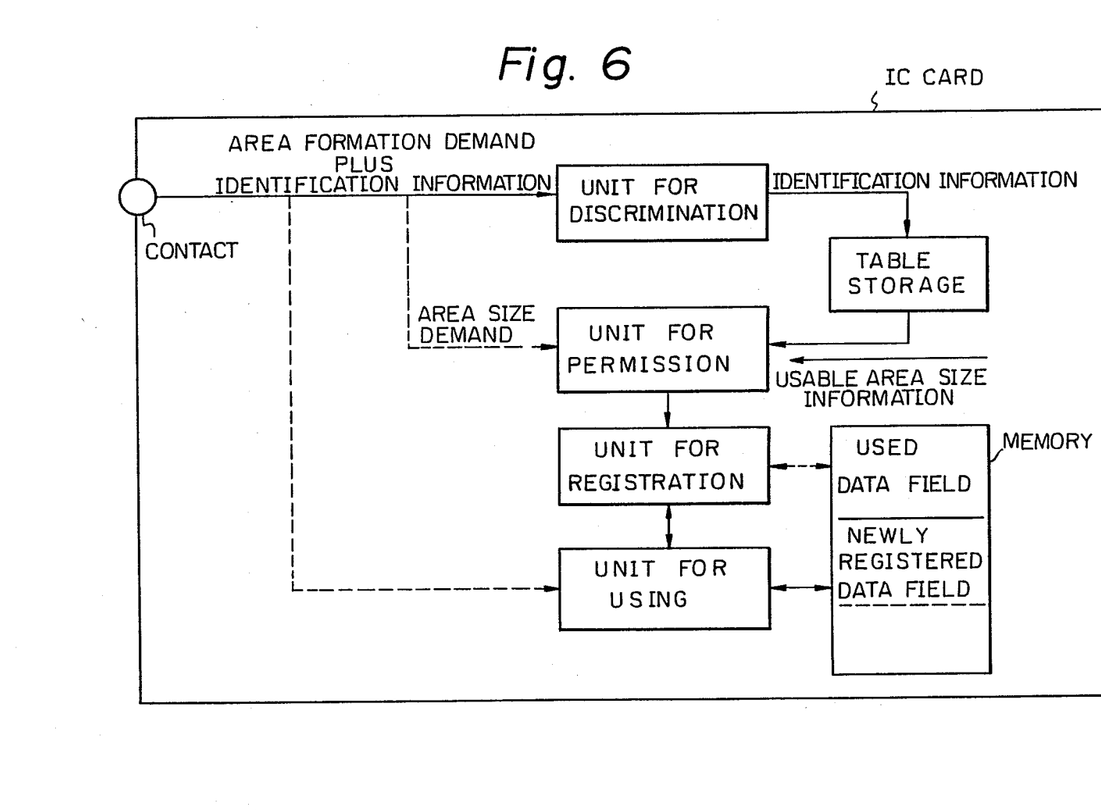
FIG. 6 is a block diagram for supplementarily explaining the system shown in FIG. 4.

FIG. 6 is a block diagram for supplementarily explaining the system of the present invention. That is, from another point of view, the system shown in FIG. 4 can be considered as one having an arrangement shown in FIG. 6.

A unit for using a memory accesses a use area registered in a unit for registration based on a demand for processing various services supplied from a contact. A table storage stores an area size of a data field that can be assigned to a memory wtih respect to processing of various services, e.g., the number of bytes. The memory has a plurality of data fields. The memory has data fields corresponding to an area user who has already provided a service using this IC card or corresponding to the types of service processing.

Even if a given service is registered in advance in the table storage, if it has not been actually used yet, that is, if a card user does not wish to register the given service and does not register in a service company, no data field corresponding to the service is formed.

In a unit for permission, an area size demand of new service processing supplied from an external apparatus through the contact is compared with a usable area size read out from the information storage table. As a result of comparison, if the area size demand is equal to or smaller than the usable area size, data corresponding to an address space of a size corresponding to one of the area size demand and the usable area size, e.g., a start address and a byte length of a data field area, are stored in the unit for registration, thus permitting the subsequent use.

I claim:

1. A system for data field area acquisition in an IC card for multiple services, comprising:
   a plurality of data fields for storing data;
   area user identification input means;
   area user authentication code input means;
   area size demand input means;
   area user authentication means;

area size calculating means for calculating a remainder area for an authenticated area user;

table storage means for storing a table for data field control; and data field area acquiring means, the calculation of the remainder area for a user authenticated by said area user authentication means being carried out based on an input area size demand from said area size demand input means, and information stored in said table storage means, the acquistion of an additional data field area being carried out within a limit of usable area size based on the cumulative result of the area user authentication and the calculation of the remainder area for the authenticated area user.

2. A system according to claim 1, wherein said table storage means stores a plurality of area user identifications, area user authentication codes corresponding to the area user identifications, and usable area size information corresponding to each area user.

3. A system according to claim 1, wherein said area user identification input means, said authentication code input means, and said table storage means produce signals which are used to operate said area user authentication means.

4. A system according to claim 1, wherein said area user authentication means, said area size demand input means, and said table storage means produce signals which are used to operate said area size calculating means.

5. A system for data field area acquisition in an IC card for multiple services, comprising:

memory means for storing a plurality of data fields for storing data, and for storing a table for data field control, the table including plural sets of information, each of which includes an area user identification, a corresponding user authentication code, and a corresponding usable area size;

input means for inputting an area user identification, an area user authentication code, and an area size demand; and processing means for authenticating the input area user identification and the input user authentication code based on the information stored in the table, for calculating a remainder area available to an authenticated area user based on the input area size demand and the corresponding usable area size information included in the table for data field control, and for designing an additional data field area within the limit of usable area size based on the remainder area for the authenticated area user.

6. A method for data field area acquisition of a plurality of data fields for storing data in an IC card for multiple services, comprising the steps of:

(a) storing in table storage plural sets of information, each of which includes an area user identification, a corresponding user authentication code, and a corresponding usable area size;

(b) comparing an input area user identification with the information stored in the table storage to determine whether the input area user identification is one of the area user identifications stored in the table storage and identifying the area user identification in the table storage;

(c) verifying an input user authentication code with the user authentication code from the table storage corresponding to the input area user identification and identified in said step (b);

(d) reading out the usable area size information corresponding to the user authentication code from the table storage corresponding to the verified input user authentication code;

(e) determining a used area size for the area user corresponding to the verified input user authentication code;

(f) subtracting the used area size from the usable area size information read out in said step (d);

(g) comparing an input area size demand with the difference determined in said step (e) to determine whether a sufficient vacant area is available; and (h) acquiring a new data field area from the vacant area of the IC card if the input area size demand is equal to or less than the vacant area determined in said step (g).

* * * * *

UNITED STATES PATENT AND TRADEMARK OFFICE
CERTIFICATE OF CORRECTION

PATENT NO. : 4,831,245
DATED : MAY 16, 1989
INVENTOR(S) : NOBUO OGASAWARA

It is certified that error appears in the above-identified patent and that said Letters Patent is hereby corrected as shown below:

FRONT PAGE, Col. 2, line 1, "MacMilian" should be --MacMillan--;

FRONT PAGE [57] ABSTRACT,
　　line 1, "size of area" should be --area size--;
　　line 6, delete "size of"; and
　　line 7, after "area" insert --size--.

Col. 2, line 52, "exteral" should be --external--.

Col. 3, line 29, "potion" should be --portion--;
　　line 31, "corresponding to an area user." should be --stored in the table storage 5.--;
　　line 32, before "identification" insert --authentication code corresponding to an area user--.

Signed and Sealed this

Thirteenth Day of March, 1990

Attest:

JEFFREY M. SAMUELS

*Attesting Officer*　　　Acting Commissioner of Patents and Trademarks